US006737758B2

(12) United States Patent
Weyerstall et al.

(10) Patent No.: US 6,737,758 B2
(45) Date of Patent: May 18, 2004

(54) MOTOR-VEHICLE DOOR LOCKING SYSTEM WITH QUICK UNLOCKING

(75) Inventors: Bernd Weyerstall, Wuppertal (DE); Peter Bartel, Hattingen (DE)

(73) Assignee: Robert Bosch GmbH, Stuttgart (DE)

( * ) Notice: Subject to any disclaimer, the term of this patent is extended or adjusted under 35 U.S.C. 154(b) by 193 days.

(21) Appl. No.: 10/030,090

(22) PCT Filed: Mar. 29, 2001

(86) PCT No.: PCT/DE01/01273

§ 371 (c)(1), (2), (4) Date: May 20, 2002

(87) PCT Pub. No.: WO01/88316

PCT Pub. Date: Nov. 22, 2001

(65) Prior Publication Data

US 2002/0149262 A1 Oct. 17, 2002

(30) Foreign Application Priority Data

May 15, 2000 (DE) ........................................ 100 23 311

(51) Int. Cl.$^{7}$ .......................... B60R 25/04; B60K 28/00

(52) U.S. Cl. ...................................... 307/10.2; 180/286

(58) Field of Search .............................. 307/10.1, 10.2; 180/286, 287; 280/727

(56) References Cited

U.S. PATENT DOCUMENTS 5,240,296 A 8/1993 Kobayashi
5,697,236 A 12/1997 Kleefeldt et al.

FOREIGN PATENT DOCUMENTS

| | | | |
|---|---|---|---|
| DE | 195 21 024 | A | 12/1996 |
| DE | 196 17 038 | A1 | 11/1997 |
| DE | 196 29 709 | A1 | 1/1998 |
| DE | 197 52 974 | A | 9/1998 |
| EP | 0 064 942 | A | 11/1982 |

*Primary Examiner*—Gregory J. Toatley, Jr.
(74) *Attorney, Agent, or Firm*—Nixon Peabody LLP; David S. Safran

(57) ABSTRACT

A motor vehicle door lock system with a vehicle lock, which can be locked and unlocked by a motor, includes a lock element which can be moved between a locked position and an unlocked position, and a central interlock drive with a slow-running drive element with which the lock element can be moved, with control electronics with a passive entry function, a speed unlocking element and a remote control module for the operator. The motor vehicle door lock system includes a clutch which engages only with a minimum rpm, which ensures that the lock element can be easily moved by hand with the central interlock drive stationary. The speed unlocking element is assigned to the central interlock drive on this side of the clutch and can be immediately actuated by the central interlock drive upon starting. The speed unlocking element immediately moves the lock element or an element of the lock mechanism downstream of it, the central interlock drive follows up, with the clutch engaged, more slowly into the unlocked position or via the unlocked position in to the next rest position when actuated out of the locked position into the unlocked position.

16 Claims, 3 Drawing Sheets

MOTOR-VEHICLE DOOR LOCKING SYSTEM WITH QUICK UNLOCKING

BACKGROUND OF THE INVENTION

1. Field of Invention

The invention relates to a motor vehicle door lock system with a motor vehicle lock which can be locked and unlocked by a motor and which can be opened mechanically or by a motor, and with control electronics.

2. Description of Related Art

Conventional electromechanical motor vehicle door lock systems with radio remote control, but without the passive entry function, are known. In these classical vehicle door lock systems the operator presses a button on the remote control module. This activates the control electronics which passes through its reaction phase immediately. Based on the distance of the operator when the button of the remote control module is pressed, the operator reaches the outside door handle on the motor vehicle door with such a long time delay that the reaction phase of the control electronics has long been completed and the motor vehicle lock has been unlocked. By pulling on the outside door handle, the operator opens the motor vehicle door, the motor vehicle lock either opening mechanically, therefore the detent pawl being lifted by the motion of the outside door handle, or opening electromechanically or pneumatically, the outside door handle delivering a control signal to the opening drive to raise the detent pawl.

One such conventional electromechanical motor vehicle door lock system is known for example from U.S. Pat. No. 5,240,296. The lock element is driven by an electric motorized central interlock drive with an electric drive motor and a worm gear pair. The worm wheel of the worm gear pair is the drive element of the central interlock drive and it runs comparatively slowly. The shifting of the lock element from the locked position into the unlocked position by means of the central interlock drive requires at least 50 ms, usually longer.

Control electronics with a so-called passive entry function, also called an “electronic key”, differs from the above explained classical motor vehicle door lock system in that on the remote control module no manipulation is necessary, therefore a button need not be pressed to unlock the motor vehicle lock when approaching the motor vehicle. Rather, this takes place all by itself simply when the operator approaches the motor vehicle.

A motor vehicle door lock system with a passive entry function requires for the control electronics a certain reaction phase which is ordinarily composed of a starting interval to activate the system as the remote control module approaches, an authorization check interval to check the operator for his authorization using the coding of the signals exchanged between the remote control module and the control electronics, and finally the actual action interval in which the action takes place, especially the unlocking of the motor vehicle lock is carried out. (A corresponding reaction phase is also needed when locking the motor vehicle door lock system, but this is less critical because it is essentially unnoticed by the operator.)

A length of the reaction phase of roughly 150 milliseconds compared to conventional motor vehicle door lock systems is perceived as long if the starting interval is begun only when the outside door handle is activated. Pulling the outside door handle or the like can take place in a passive entry function under certain circumstances when the reaction phase of the control electronics has not yet been completed. The operator is annoyed that he must then pull the door handle a second time and this is interpreted as a “malfunction”.

Since the resulting total time of the reaction phase cannot be shortened as much as desired, attempts have already been made to conceal the delay time as is described in the published German reference DE-A-195 21 024. In this motor vehicle door lock system the starting interval and the authorization check interval of the control electronics are shifted into the phase which precedes the actual operation phase which is noticeable to the operator. Then, simply the remaining time which corresponds to the reaction time of mechanical, conventional motor vehicle door lock systems is noticeable to the operator.

A different approach is to have the starting interval of the control electronics initiated not only when the outside door handle is activated, but to use the approach of the hand of the operator to the outside door handle to initiate the starting interval. For this purpose, a proximity sensor on the outside door handle is described in German published references DE-A-197 52 974 and DE-A-196 17 038, by which the proximity of the hand of the operator is acquired roughly 100 to 150 ml before the hand touches of the outside door handle. Initiation of the starting interval of the control electronics, therefore the “wakening” of the control electronics, therefore takes place so far in advance of the actual pulling of the outside door handle that the starting interval and generally also the authorization check interval have already been completed when the outside door handle is in fact moved by the hand of the operator.

The use of proximity sensors in motor vehicle door lock systems of the type under consideration entails various difficulties. On the one hand, the proximity sensors have a comparatively high rest current, on the other hand it is difficult to set a stable, definite response threshold. External influences such as rain, snow, dirt and dust greatly change the measured values in capacitive proximity sensors. Finally, in proximity sensors the problem of the stray electromagnetic radiation emitted by them cannot be ignored. Therefore, in spite of the aforementioned difficulties, motor vehicle door lock systems with the passive entry function in which only actuation of the outside door handle by the hand of the operator initiates the starting interval of the control electronics also have major advantages.

As can be taken from the aforementioned, in motor vehicle door lock systems with a passive entry function in all the aforementioned versions there is the problem that the reaction of the control electronics is preferably to be shortened as much as possible, in any case with respect to perception by the operator.

For themselves, it is known in motor vehicle door lock systems that the central interlock drive can be connected via a centrifugal clutch to the drive element for the lock element as described in published European reference EP 0 064 942 B1. This makes it possible to move the lock element by hand without major resistance if the central interlock drive is stationary. This is one alternative to the initially addressed construction of a conventional electromechanical motor vehicle door lock system in which this shifting by hand is implemented without major resistance by a corresponding configuration of the lock element. In any case, the construction there does not act in each position of the central interlock drive, therefore especially not when the central interlock drive remains stopped in an unintended position. Here the use of a centrifugal clutch has clear advantages.

In the motor vehicle door lock systems with a centrifugal clutch, on the central interlock drive the problem of reaction time then arises even if there is no passive entry function. The central interlock drive must first reach the necessary rpm before the centrifugal clutch engages and closes the energy transmission train to the lock mechanism.

SUMMARY OF THE INVENTION

The teaching of the invention is to improve a motor vehicle door lock system of the type under consideration, especially one with a passive entry function with respect to the reaction of the control electronics with consideration of the fact that the central interlock drive is equipped with a clutch which engages only with the beginning of minimum rpm, especially in the form of a centrifugal clutch.

The aforementioned object is achieved by a motor vehicle door lock system. On the central interlock drive of each motor vehicle lock a clutch, which engages only with the beginning of minimum rpm, especially in the form of a centrifugal clutch, is assigned to the motor vehicle door lock system. Then, additional speed unlocking is implemented in a manner which is tailored to the particulars of the centrifugal clutch. This is based on the finding that speed unlocking is achieved when the centrifugal clutch is essentially bypassed for the unlocking process. In principle, all the advantages of the use of a centrifugal clutch are achieved, nevertheless the disadvantage of the use of one such clutch is eliminated such that it needs a certain time until the central interlock drive, especially after the end of the authorization check interval in a passive entry function, starts and reaches the minimum rpm and only then is able to move the lock element via the centrifugal clutch.

Immediately after starting the central interlock drive in the passive entry function, therefore immediately after completion of the authorization check interval and in the first part of the action interval, the lock element is moved into the unlocked position. The corresponding applies of course to an element which is downstream of the lock element in the lock mechanism in the energy transmission chain. What is important is that by means of the speed unlocking element the unlocked position of the motor vehicle lock can be reached within a few milliseconds, especially roughly 10 ms. The effort necessary for this purpose is minimal, only a simple bypass construction for the clutch is necessary. The advantages of using a clutch, especially in the form of a centrifugal clutch, are preserved. Its disadvantages, specifically the delay of the response of the central interlock drive are however elegantly eliminated It is important that the central interlock drive itself is made classically with a slow running drive element and also the time delay for the response which is caused by the centrifugal clutch continues to be present. The central interlock drive is followed-up with an inevitable time delay and after a slightly longer time interval is then in its readiness position for the next function.

The teaching of the invention can be used especially valuably when as already explained above for the prior art, the starting interval is initiated by the hand of the operator in fact actuating, especially touching the outside door handle. In this form, which can dispense with a proximity sensor, for a long time the length of the reaction phase was a special problem because the time advance, which is an advantage in proximity sensors, is absent. But also in a motor vehicle door lock system equipped with a proximity sensor does the teaching of the invention, of course, yield a time advantage.

The teaching of the invention can be integrated especially feasibly also in the already existing classical electromechanical motor vehicle door lock systems without major additional cost so that in existing constructions the passive entry function can be used without disadvantages in the ease of actuation.

The teaching of this invention can be used especially when the motor vehicle door lock is made as an electric lock which is actuated by sensors in the lock mechanism. In one such technology the chains of dynamic effect from the outside door handle, the inside door handle, and optionally from the lock cylinder into the lock mechanism are used only for actuation of the corresponding switches or to influence the corresponding sensors. Based on the existence of mechanical chains of dynamic effect however, if necessary the lock mechanism can be used for purposes of actuating the detent pawl, etc. This concept is the subject matter of co-pending, commonly owned, U.S. patent application Ser. No. 09/550,597 which is incorporated herein in its entirety by reference.

Finally, the teaching of this invention can also be used in a motor vehicle door lock system without a passive entry function, for example, in especially comfortable motor vehicle door lock systems in conjunction with the actuation of the outside door handle.

These and other advantages and features of the present invention will become more apparent from the following detailed description of the preferred embodiments of the present invention when view in conjunction with the accompanying drawings.

DETAILED DESCRIPTION OF THE PREFERRED EMBODIMENTS

Figure 1:
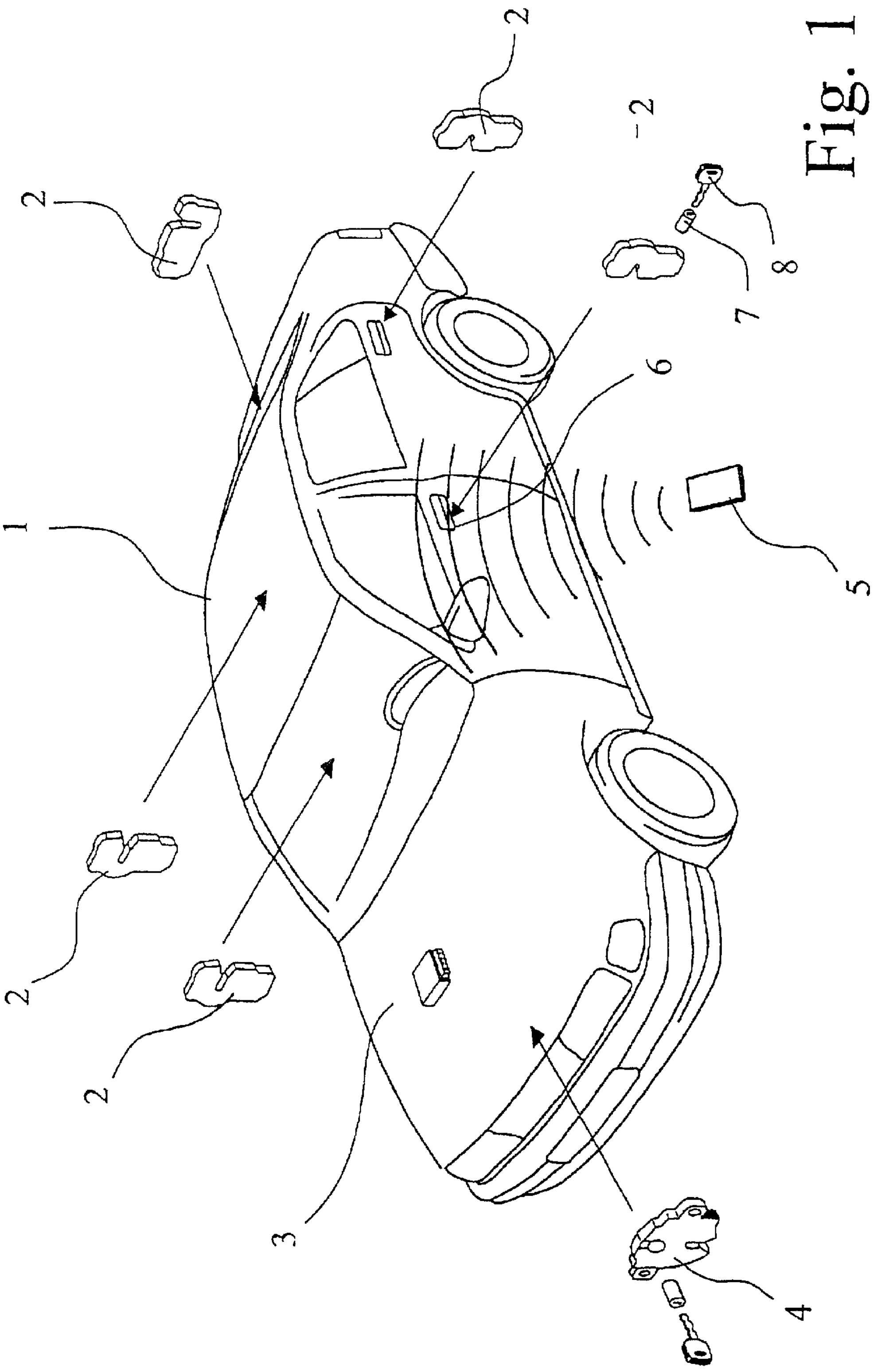
FIG. 1 shows in a schematic and perspective view a motor vehicle with a door lock system in accordance with one exemplary embodiment of the invention.

The motor vehicle 1 which is shown schematically in FIG. 1 has a motor vehicle door lock system in which the different motor vehicle locks 2 for motor vehicle doors and motor vehicle hatches are shown schematically with their installation positions. Each motor vehicle lock 2 can be locked and unlocked by a motor, preferably an electric motor, likewise by means of a central interlock drive. In the version as an electric lock, as shown here, the motor vehicle lock 2 additionally has the possibility of motorized opening, therefore lifting of the detent pawl, by means of an opening drive. In this case, unlocking and locking can also take place using only circuitry. Another version is also to equip the motor vehicle locks 2 with a auxiliary closing drive which can be identical to the opening drive or can be separate from it. Reference should be made in this respect in general to the prior art German published reference DE-A-196 29 709, etc.

In the motor vehicle door lock system there is control electronics 3 which is illustrated here as central control electronics, which however can also be assigned decentralized to each of the motor vehicle locks 2. There are furthermore a key-operated hood lock 4 for the hood of the motor vehicle and a remote control module 5 which is made as a passive chip card. The control electronics 3 works overall with a passive entry function, therefore with an "electronic key". Also in this respect reference should be made to the aforementioned prior art. It is important that fundamentally the teaching can also be used in a motor vehicle door lock system with control electronics which is not equipped with a passive entry function.

On the motor vehicle body an outside door handle 6 or the like is recognizable on the respective motor vehicle door, and on the driver's door a lock cylinder 7 for actuation with a mechanical key 8, this actuation taking place in the case of an emergency (emergency unlocking and optionally emergency opening).

As has already been explained for the prior art which forms the starting point i.e. German published reference DE-A-195 21 024, in this motor vehicle door lock system it must be considered that the control electronics 3 in terms of time requires a reaction phase with a starting interval, authorization check interval and action interval, especially for unlocking the motor vehicle lock 2.

Figure 2:
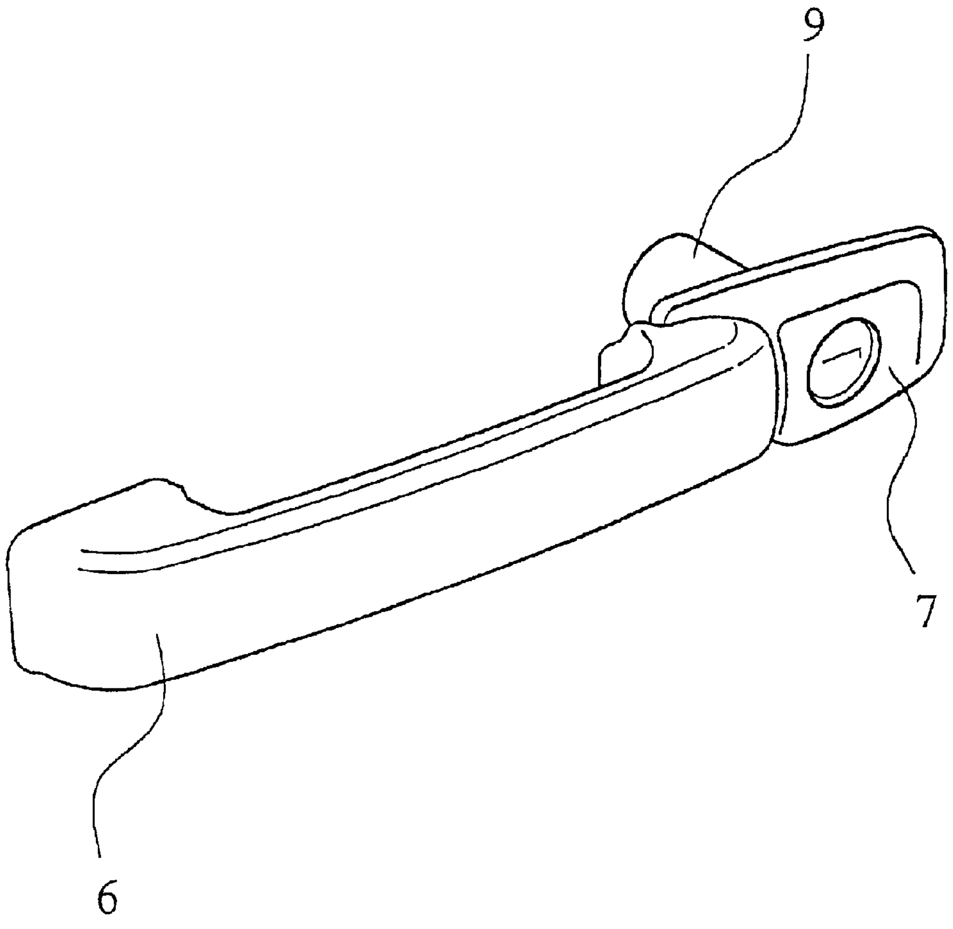
FIG. 2 shows an outside door handle arrangement in a motor vehicle door lock system of FIG. 1.

It has already been established in the prior art that the starting interval of the control electronics 3 is initiated by the hand of the operator touching the outside door handle 6. FIG. 2 shows a typical door handle arrangement of a motor vehicle door lock system of the type under consideration with the outside door handle 6 and the lock cylinder 7. A switching means 9 on the outside door handle 6 with which the operating signal is triggered when the outside door handle 6 is pulled in order to trigger the electric opening drive for lifting the detent pawl is also shown. This is one version of an electric lock; in a mechanically activated lock the switching means 9 is replaced by a transmission mechanism.

Figure 3:
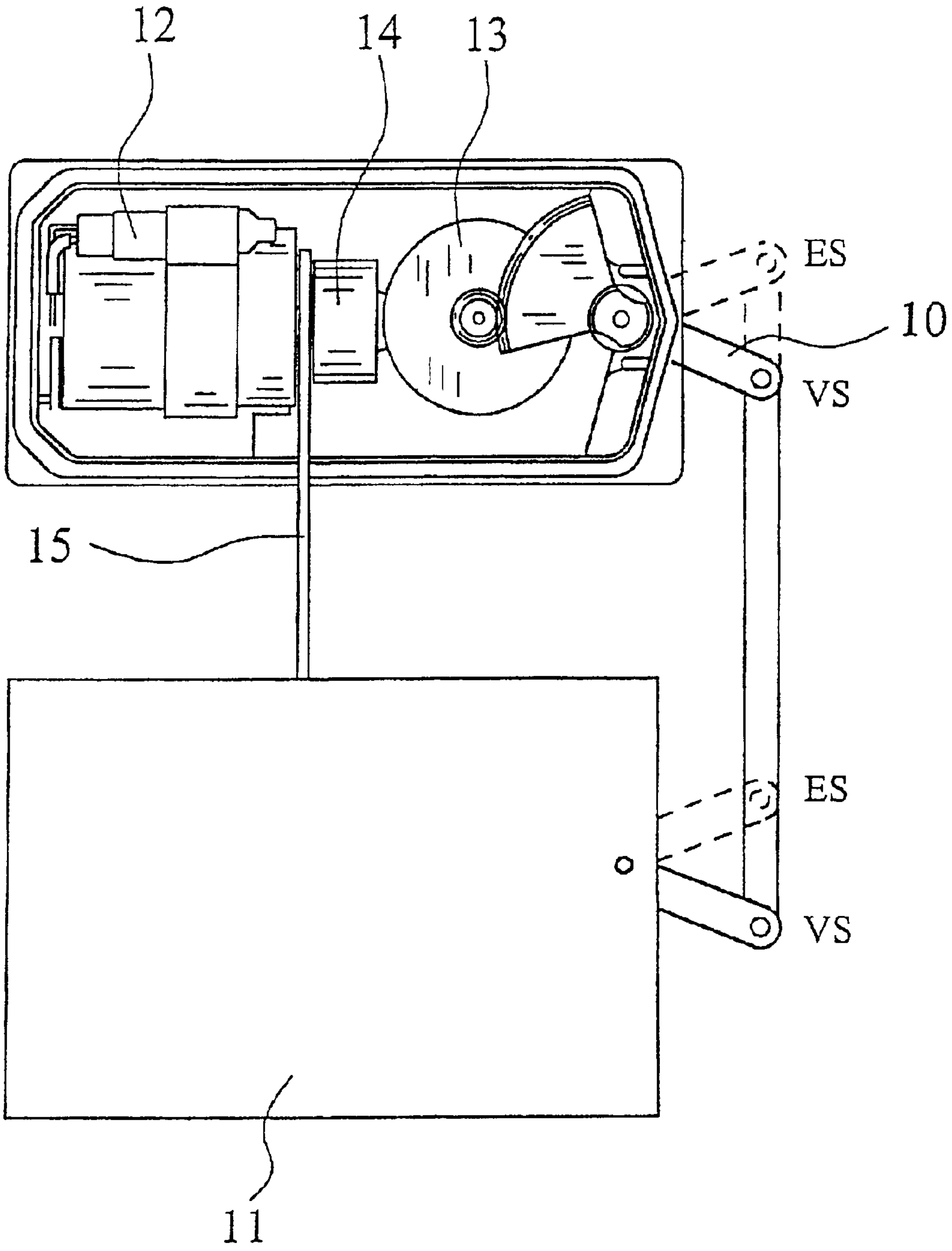
FIG. 3 shows a schematic view of a motor vehicle lock with a central interlock drive and speed unlocking element according to one embodiment of the invention.

FIG. 3 shows that the motor vehicle lock 2 of the motor vehicle door lock system in this embodiment has first a lock element 10 which can be shifted between a locked position and an unlocked position. As FIG. 3 shows, the lock element 10 is coupled to the remaining lock mechanism 11, and this lock mechanism 11 need not be further explained. The lock element 10 in any case is overthrown by means of a preferably electrical central interlock drive 12 which is shown here with a slow-running drive element 13 from the locked position into the unlocked position and vice versa. This is indicated by the letters VS [locked position] and ES [unlocked position] on the lock mechanism 11.

In the locked position the motor vehicle lock 2 cannot be opened, in the unlocked position of the lock element 10 the motor vehicle lock 2 can be opened. How opening proceeds, whether mechanically or by motor, is irrelevant in this connection. To this extent the alternatives of the prior art can be accomplished here.

The embodiment shown illustrates the electrical central interlock drive 12 with an electrical drive motor and a worm gear pair with a worm gear which forms the slow-running drive element 13 for the lock element 10. Alternatives to the corresponding central interlock drives 12 are also linear drives with a threaded spindle as the slow-running drive element 13. Pneumatic central interlock drives 12 are also of course known.

It is important that slow-running drive element 13 can move the lock element 10 back and forth between the locked position and the unlocked position, but that this takes place relatively slowly.

It is now provided as claimed in the invention that between the central interlock drive 12 and the drive element 13 there is a clutch 14 which engages only with the beginning of a minimum rpm and which ensures that the lock element 10 can be easily moved by hand with the central interlock drive 12 stationary. Generally, this clutch 14 is a centrifugal clutch in one or the other embodiment. Reference should be made to the prior art in this respect (EP 0 064 942 B1).

The fact that the clutch 14 engages only with the beginning of minimum rpm of the central interlock drive 12 means that after the authorization check interval a longer time passes again until the unlocked position of the lock mechanism is reached from the locked position. This is answered by the fact that the speed unlocking element 15 is assigned to the central interlock drive 12 on this side of the clutch 14. The speed unlocking element 15 can be immediately actuated by the central interlock drive 12 upon starting. When the central interlock drive 12 starts, immediately after the control electronics 3 has completed the authorization check interval, the speed unlocking element 15 is also immediately actuated. It is now configured such that it immediately moves the lock element 10 or an element of the lock mechanism 11 downstream of the lock element out of the locked position into the unlocked position.

The central interlock drive 12 itself runs, with the clutch 14 engaged, accordingly more slowly into the unlocked position or via the unlocked position into the next rest position. The advantage of bypassing the centrifugal clutch as necessary by the speed unlocking element 15 is accomplished advantageously when the control electronics 3 is not equipped for a passive entry function, especially when the outside door handle is actuated.

As has already been explained in the general part of the specification, the length of the reaction phase when the motor vehicle lock is unlocked is more problematic than when locking the motor vehicle lock, because it is essentially unnoticed by the operator there. The speed unlocking element 15 is therefore used first of all for unlocking and thus for moving the lock element 10 out of the locked position into the unlocked position.

After completion of the reaction time which is typical of the central interlock drive 12 including the clutch 14, the lock mechanism 11 is again completely synchronous. The central interlock drive 12 with its drive element 13 can then be used in the classical manner for locking of the motor vehicle lock 2, therefore for return of the control element 10 from the unlocked position into the locked position.

Otherwise, it can be intended for the central interlock drive 12 to provide for unlocking, therefore for displacement of the lock element 10 out of the locked position into the unlocked position, in motor vehicle locks 2 on a motor vehicle which have not been directly actuated by the operator, therefore for example on the passenger's door and on the two rear side doors.

With respect to the configuration of the lock mechanism 11, it is recommended that the speed unlocking element 15 can be moved by the starting central interlock drive 12 out of its rest position into its actuation position and by the lock element 10 which has been reset from the unlocked position into the locked position or the element of the lock mechanism downstream of the lock element out of its actuation position back into its rest position.

The corresponding characteristics of the lock mechanism 11 can be accomplished by a backlash connection for which there are numerous models in the prior art. In this embodiment there is one version for this which is characterized in that the lock element 10 is entrained on one side by interlocking by the drive element 13 and in the opposite direction via releasable catching. As shown in FIG. 3 an interlock element 13*a* is recognizable on the drive element 13. The releasable catching is not shown in FIG. 3 for reasons of graphics.

The speed unlocking element 15 can be connected more or less by interlocking to the lock mechanism 11 or the lock element 10. But especially quick-reaction speed unlocking occurs by the speed unlocking element 15 being made as a spring snap element which is only released by the central interlock drive 12 and then snaps into its actuation position under spring force. The speed unlocking element 15 is triggered in the manner of a spring-loaded catch only by the starting central interlock drive 12, further motion of the lock element 10 into the unlocked position is then executed lighting-fast by the pretensioned spring.

The teaching of the invention is of special importance when for example there is no possibility for concealing part of the reaction time of the control electronics 3 by a proximity sensor. This therefore also applies to a motor vehicle door lock system in which the starting interval is initiated by the hand of the operator actuating the outside door handle 6, especially simply touching it.

The subject matter of the invention is not only a motor vehicle door lock system overall, but also a motor vehicle lock individualized functionally to the invention, which, specifically assigned not only to the preferably electrical central interlock drive 12 with the slow running drive element 13, but also to the lock element 10, has the above explained clutch 14 with the speed unlocking element 15.

While one embodiment in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

What is claimed is:

1. A motor vehicle door lock system for a vehicle with a vehicle lock, comprising:

a lock element adapted to move between a locked position and an unlocked position;

an interlock drive and a drive element adapted to move the lock element between the locked position and the unlocked position;

control electronics adapted to command the interlock drive to move the lock element in response to a signal from a remote control module;

a clutch between the drive element and the interlock drive, wherein the clutch only engages the interlock drive to the drive element at a predetermined minimum rpm of the interlock drive, wherein the clutch is adapted to allow manual movement of the lock element by the drive element; and a speed unlocking element positioned between the interlock drive and the clutch, wherein the speed unlocking element is adapted to immediately unlock the lock system in response to the command from the control electronics to the interlock drive.

2. The system of claim 1, wherein the speed unlocking system is adapted to unlock the lock system by moving the lock element from the locked position and the unlocked position.

3. The system of claim 1, further comprising a downstream lock element which is adapted to move between a locked position and an unlocked position, and wherein the speed unlocking system is adapted to unlock the lock system by moving the downstream lock element from the locked position to the unlocked position.

4. The system of claim 3, wherein the speed unlocking element is adapted to be moved by the downstream lock element out of a rest position into an actuation position, when the downstream lock element has been reset from the unlocked position into the locked position.

5. The system of claim 1, wherein the control electronics includes a passive entry system.

6. The system of claim 5, wherein the passive entry system of the control electronics provides a starting interval, an authorization check interval and an action interval.

7. The system of claim 6, wherein the motor vehicle lock is unlocked during the action interval.

8. The system of claim 6, wherein the starting interval is adapted to be initiated in response to a signal from the remote control module.

9. The system of claim 6, wherein the action interval is adapted to be initiated by a hand of an operator actuating an outside door handle on the vehicle.

10. The system of claim 1, wherein the interlock drive is an electrical central interlock drive.

11. The system of claim 1, wherein the drive element is a slow-running drive element.

12. The system of claim 1, wherein the clutch is a centrifugal clutch.

13. The system of claim 1, wherein the speed unlocking element is adapted to be moved by the interlock drive out of a rest position into an actuation position.

14. The system of claim 1, wherein the speed unlocking element is adapted to be moved by the lock element out of a rest position into an actuation position, when the lock element has been reset from the unlocked position into the locked position.

15. The system of claim 1, wherein the lock element is adapted to be entrained by interlocking by the drive element and in the opposite direction via releasable locking.

16. The system of claim 1, wherein the speed unlocking system comprises a spring snap element which is adapted to be released by the interlock drive, wherein the snap spring element snaps into an actuation position under spring force.

* * * * *